United States Patent [19]

Briley et al.

[11] 4,412,322

[45] Oct. 25, 1983

[54] TIME DIVISION SWITCHING SYSTEM

[75] Inventors: Bruce E. Briley, Countryside; John Montsma, Wheaton, both of Ill.

[73] Assignee: Bell Telephone Laboratories, Incorporated, Murray Hill, N.J.

[21] Appl. No.: 190,517

[22] Filed: Sep. 25, 1980

[51] Int. Cl.³ .......................................... H04Q 11/04
[52] U.S. Cl. ........................................ 370/58; 370/63
[58] Field of Search ..................... 370/58, 63, 6, 59; 371/30

[56] References Cited

U.S. PATENT DOCUMENTS

| | | | |
|---|---|---|---|
| 3,736,381 | 5/1973 | Johnson et al. | 370/63 |
| 3,920,914 | 11/1975 | Reginer et al. | 370/63 |
| 3,983,330 | 9/1976 | Tongl | 370/63 |
| 4,071,702 | 1/1978 | Charransol et al. | 370/16 |
| 4,074,077 | 2/1978 | Charransol et al. | 370/58 |
| 4,123,624 | 10/1978 | Gagnier et al. | 370/58 |
| 4,201,891 | 5/1980 | Lawrence et al. | 370/58 |

Primary Examiner—Douglas W. Olms
Attorney, Agent, or Firm—J. W. Herndon

[57] ABSTRACT

A time division multiplex (TDM) switching network is disclosed in which at least part of the network comprises a space switching portion (TMS) and in which the need for duplication of the space switching portion, and like methods of achieving network reliability, is eliminated. Data from an incoming channel is partitioned into successive blocks, a prescribed number of which form a set of blocks. The blocks are of predetermined size. Each of the blocks of a set is switched via different paths of the space portion of the network. A single network fault can therefore cause the loss of only one block of data in a set. This loss can be made insignificant in the case of data representing telephone conversations. For data not representing telephone conversations, error checking and correcting information is added to the set before transmission through the space portion of the network and errors occurring during transmission are corrected thereafter.

24 Claims, 8 Drawing Figures

FIG. 7

TIME DIVISION SWITCHING SYSTEM

TECHNICAL FIELD

This invention pertains to time division multiplex telephone switching networks and, in particular, to method and structure for improving the reliability of such networks without requiring duplication and similar forms of switching redundancy.

BACKGROUND OF THE INVENTION

Time division switching networks are well known. In general, such networks usually comprise at least one time division switching stage, referred to herein as a time slot interchange (TSI), and at least one space switching stage, referred to herein as a time multiplexed switch (TMS). The TSI may comprise a buffer memory containing storage for each time slot (channel) of an incoming time division multiplexed line. In a system in which time multiplex switching precedes space multiplex switching, information arriving in time slots on the line is stored in the respectively assigned buffer storage locations for the time slots and are unloaded and switched through the space portion of the network in other network time slots in accordance with instructions stored in a control memory.

It has generally been considered that redundancy of at least the space switching stage is required for a time division network to be reliably acceptable. For example, the No. 4 ESS time division switching system, manufactured by Western Electric Co., Inc., incorporates a time-space-time switching network in which the space portion of the network is completely duplicated. Other redundancy schemes that have been used in time division networks include, for example, total network duplication and N+1 redundancy in which one subportion, e.g., a grid may be substituted as a spare for one of a plurality of other subportions.

Obviously, such structural redundancy is expensive and undesirable if other acceptable ways can be found to improve reliability.

SUMMARY OF THE INVENTION

The above problem is solved and a technical advance is achieved in a method and structure for establishing time slot connections in a time division switching network. In accordance with the invention, the digits of an incoming time division multiplex channel are partitioned into successive blocks, each block containing a predetermined number of digits. A prescribed number of successive ones of these blocks are transmitted through the network to an output channel via different paths of the space portion of the network.

In one embodiment, the same paths are used repetitively and cyclically for each set of the prescribed number of blocks. In other words, the blocks are transmitted through the TMS via completely different paths until all blocks of a set have been transmitted; the process is then repeated over those same paths for succeeding block sets. A single path failure in that portion of the space network used to transmit a block set can result in the loss of only one block of information in each block set. In a conventional time division switching network, however, a single path failure can cause the loss of many calls or data connections that exclusively use the path on a shared basis for transmitting all of the time slot data pertaining to the calls.

The prescribed number of blocks in a block set which represents a telephone conversation can be chosen such that the occasional loss of one block has little or no effect on the conversation. On the other hand, if data is being switched in which no errors can be tolerated, error blocks containing detecting or error correcting codes may be generated as part of a block set and transmitted through the network also via different paths.

In the preferred illustrative embodiment, the switching network is arranged in a time-space-time configuration comprising an input TSI, an output TSI, and a TMS interconnecting the input and output TSIs. The block size in the preferred embodiment is one digit of a time slot. A block set corresponds to a time slot. An 8-bit binary pulse-code-modulated (PCM) transmission system is illustratively used so that each block (digit) is one bit of a time slot. An error correcting code capable of correcting single bit errors is generated over the 8 bits of a time slot before its transmission through the TMS. In accordance with this embodiment of the invention, each bit of a time slot and each bit of the error correction code pertaining to the time slot is transmitted via a different path of the TMS. A single TMS path failure therefore can cause only a single bit error in the information and correction bits of the time slot. Such a bit error is detected and corrected after transmission through the TMS.

DETAILED DESCRIPTION

Figure 1:
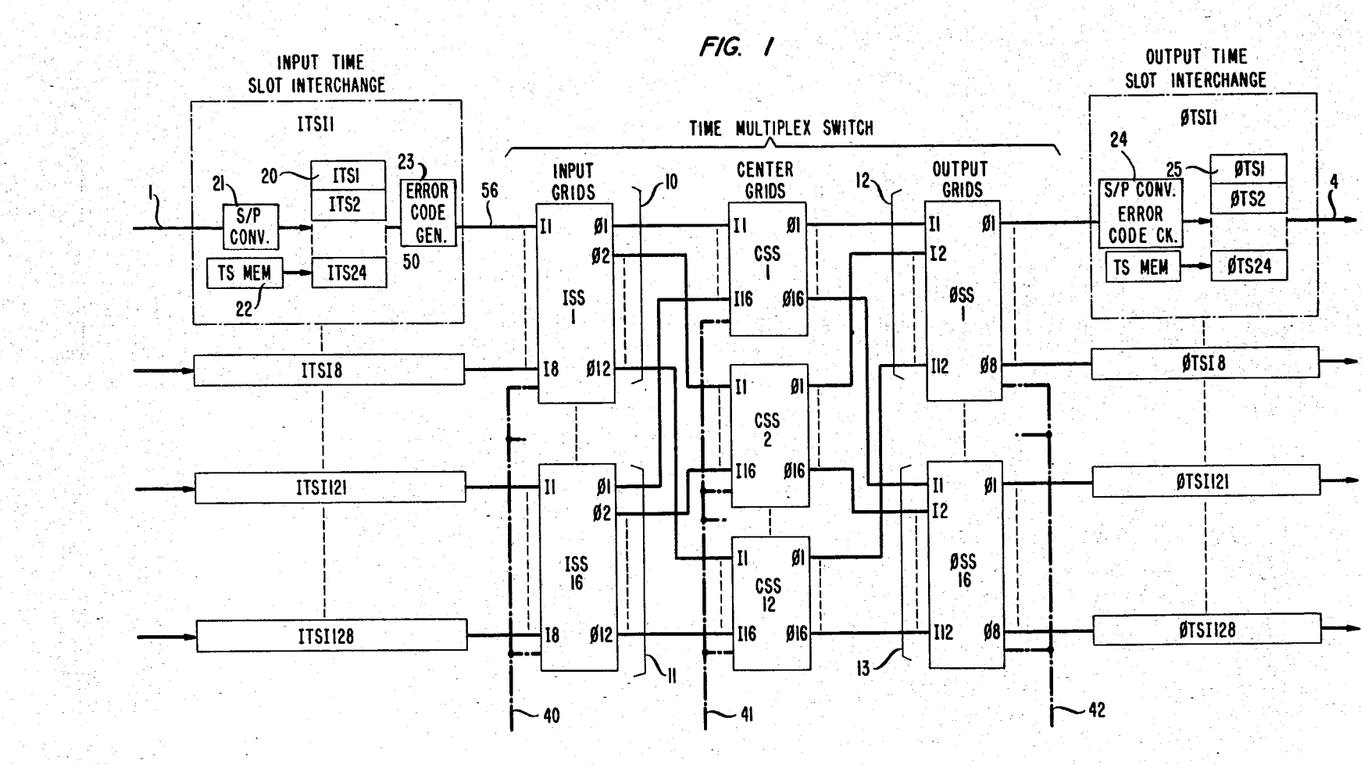
FIGS. 1 and 2 when arranged according to FIG. 3 illustrates in block diagram form the elements of a time-space-time switching network, including memory structure for controlling switches of the space portion (TMS) of the network in accordance with one embodiment of the invention.
Figures 2, 3:
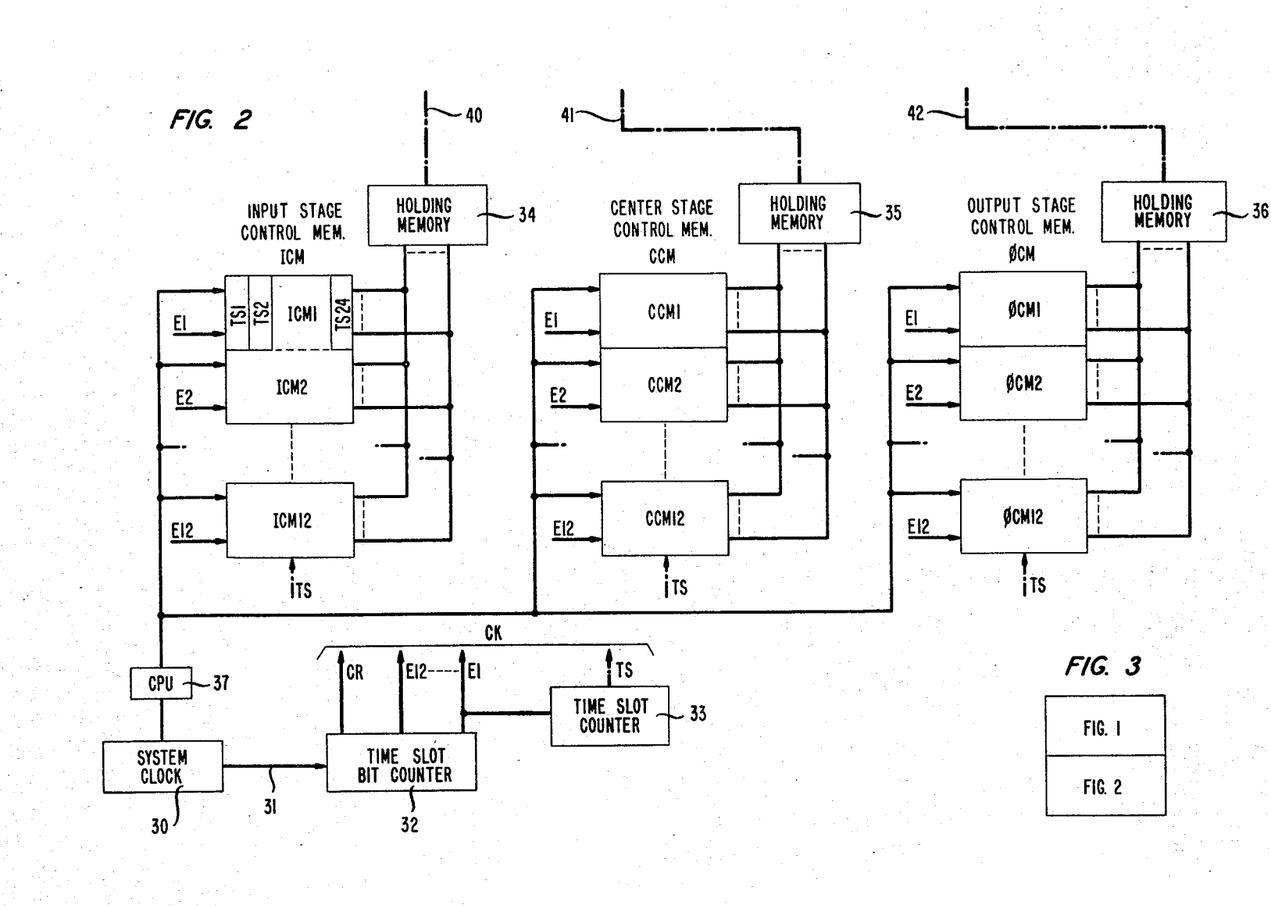

FIGS. 1 and 2 when arranged according to FIG. 3, show in block diagram form an illustrative switching network of a time division multiplex switching system. The switching elements are shown in FIG. 1 and consist of a plurality of input time slot interchanges (TSIs) ITSI1 through ITSI128, a plurality of output TSIs ØTSI1 to ØTSI128, and a space division portion referred to as a time multiplex switch (TMS) interconnecting the input and output time slot interchanges. A central processing unit (CPU) 37 in FIG. 2 recognizes call seizures and terminations and takes appropriate action to control the network as will be described.

The TMS illustratively is a 3-stage network comprising input stage switching grids ISS1 to ISS16, output stage grids ØSS1 to ØSS16, and center stage grids CSS1 to CSS12.

The input to each input TSI is a time multiplexed trunk, such as trunk 1 to ITSI1, on which appear a plurality of time slots in recurring frames to form a plurality of channels equal in number to the number of time slots of a frame. The output TSIs each connect to an outgoing trunk, such as 4, which is similar to the incoming trunks. By way of example, the trunks may be part of a digital transmission system such as the T1 digital carrier system manufactured by Western Electric Co., Inc. Each trunk of a T1 carrier system has 24 channels in which each time slot consists of 8 bits of pulse-code-modulated (PMC) information. A frame in this system consists of 24 time slots arranged in 193 bits of information. One bit of each frame is for synchronization. Each frame is 125 microseconds long. Since the TMS is reconfigured every bit time in the preferred embodiment, a reconfiguration occurs at least every (125 microseconds)/(193 bits), or every 648 nanoseconds. As will be seen, however, in the preferred embodiment 12 bits of information are switched for every 8 bits of incoming information of a time slot. Accordingly, our preferred network is reconfigured every 125/(24 time slots × 12 bits + 1 sync bit), or 433 nanoseconds. Obviously, this is easily accomplished with solid state switching components which have at the current time switching speeds in the area of 5 nanoseconds for transistor-transistor logic ($T^2L$) and 1 nanosecond for emitter-coupled logic.

In this illustrative embodiment, we transmit through the network the 8 bits of PCM information plus 4 error check bits for each time slot of information. As previously mentioned, each information and check bit associated with a time slot is transmitted through the TMS via a completely different path. These considerations dictate that in this illustrative embodiment there be at least 12 center stage grids, CSS1 to CSS12 to provide different TMS paths for the 12 information and check bits of a time slot. Each of the grids CSS1 to CSS12 is connected to an output of each of the input grids ISS1 to ISS16. For example, ISS1 has 12 outlet ports Ø1 through Ø12, each of which connect by junctors 10 to a different one of the grids CSS1 to CSS12. Similarly, junctors 11 connect the 12 output ports of ISS16 to each of the CSS1 through CSS12. Since this illustrative network is symmetrical, each center stage grid CSS1 through CSS12 has 16 outlet ports Ø1 to Ø16 which connect each of the grids to each of the output stage grids by junctors such as 12 and 13.

Each of the input stage grids, by way of example, has 8 inlet ports I1 to I8 to which different input TSIs connect. For example, ITSI1 and ITSI2 are connected to respective inlet ports I1 and I2 of ISS1. Similarly, the output stage grids each have 8 outlet ports Ø1 to Ø8 which connect to the output TSIs. Outlet Ø1 of ØSS1, for example, is connected to ØTSI1. Each of the grids may illustratively comprise a plurality of switches arranged in matrix format such that any inlet can be switched through to any outlet by the operation of a single switch. The switches should normally be of a solid-state type in order to possess the switching speed necessary to reconfigure the TMS each bit time. It is expected, however, that metallic crosspoints could be used in slow-speed applications.

All of the input TSIs are identical and all of the output TSIs are identical in this illustrative example. Accordingly only ITSI1 and ØTSI1 are discussed herein. ITSI1 fundamentally comprises an input buffer memory 20 which has a storage location for each time slot of the incoming TDM trunk 1. Since there are 24 channels in trunk 1, buffer memory 20 has 24 storage locations, ITS1 through ITS24, for the 24 time slots of a time frame. The input TSIs may also comprise other buffer memory (not shown) located ahead of the memory 20, for example, which would be used to initially receive the information from the incoming trunks to compensate for the differences in timing between different ones of the trunks and between the trunks and the network timing. A serial to parallel converter 21 converts the serial incoming bits of each time slot into parallel format, derives a buffer memory address according to the time slot in question and sends the parallel time slot data to input buffer memory 20 for storage in the appropriate time slot word. A time slot control memory 22 controls the order in which the time slot words are read out for further transmission through the network. This is conventional practice and is not described further herein.

As bits pertaining to a given time slot are read out of input buffer memory 20, they are passed through a Hamming code generation circuit 23 enroute to the associated input stage grid such as ISS1. Circuit 23 computes 4 Hamming code check bits over the 8 information bits of a time slot. Hamming code check bits are described in 29 Bell System Technical Journal 147 (April 1950). The 4 check bits have the capability in this embodiment of single bit error detection and correction. Additional check bits could be generated to protect against multiple errors, if desired. The 12 bits consisting of 8 information bits and 4 Hamming check bits are transmitted serially through the TMS to an appropriate output TSI in such a manner that a single fault in the portion of the TMS used to transmit the bits can result in only a single bit error which can be corrected in accordance with the Hamming check bits.

A system clock 30 shown in FIG. 2 generates signals on lead 31 corresponding to the timing of T1 carrier systems. A time slot bit counter 32 is triggered by the signals on lead 31 and generates timing signals on leads E1 through E12. E1 controls the transmission of the first bit of a time slot through the TMS. E2 controls the transmission of the second bit of a time slot, and so on through E12. Time slot counter 33 controls which network time slot within each frame period is being processed at any given time by monitoring the signals on lead E1. The term network time slot is used here to indicate that the time slots during which switching occurs are not directly related to the time slots of the incoming and outgoing trunks except that they have the same time length. Time slot bit counter 32 also generates a signal on lead CR, which is used to indicate the proper time, occurring after E12 and before E1, to correct bit errors after transmission through the TMS. The signals E1 to E12, TS and CR are collectively called clock signals and are labeled as CK in FIG. 2.

In FIG. 2, control memories which control the operation of switches in the TMS are shown. An input control memory (ICM) controls the operation of switches in the input stage grids ISS1 through ISS16. A center stage control memory (CCM) controls the grids CSS1 through CSS12; an output control memory (ØCM) controls grids ØSS1 through ØSS16. Each of these control memories contains information describing the state of every switch of every grid of its associated part of the TMS for each bit time of each time slot. With respect to ICM, for example, it is divided into twelve sections ICM1 through ICM12. ICM1 is enabled by signals E1 which define the first bit time of time slots. Similarly, ICM2 is enabled during the second bit times of time slots by signals E2; ICM12 is enabled during the twelfth bit times of time slots. CCM and ØCM are also divided into 12 sections, CCM1 through CCM12 and ØCM1 through ØCM12 which are enabled in a similar manner by the E1 to E12 signals.

Each of the control memory sections such as ICM1, for example, is further subdivided into 24 subsections, TS1 through TS24, each subsection being associated with a particular time slot. Each subsection TS1 through TS24 of ICM1 contains information describing the state of every switch in ISS1 through ISS16. Signals TS from time slot counter 33 determine which of the time slot subsections is to be activated. In other words, during bit time 1 of time slot 1, for example, the contents of TS1 in ICM1 are outputted. During the second bit time of time slot 1, the contents of TS1 in ICM2 are outputted, and so on. During time slot 2, the contents of subsections TS2 in each of the ICM sections are sequentially read out for each time bit. The accessing of information for CCM and ØCM to control the center and output stage grids occurs in a similar fashion.

The information outputted from ICM is stored in a holding memory 34 in FIG. 2. Similarly, information outputted from CCM and ØCM are stored in respective holding memories 35 and 36. The information stored in memory 34 is transmitted to the input stage grids ISS1 through ISS16 by means of bus 40 which has a separate lead for each bit of information. Each bit of information controls one grid switch. The information from memories 35 and 36 is transmitted to the associated center and output stage grids by means of buses 41 and 42.

Figure 4:
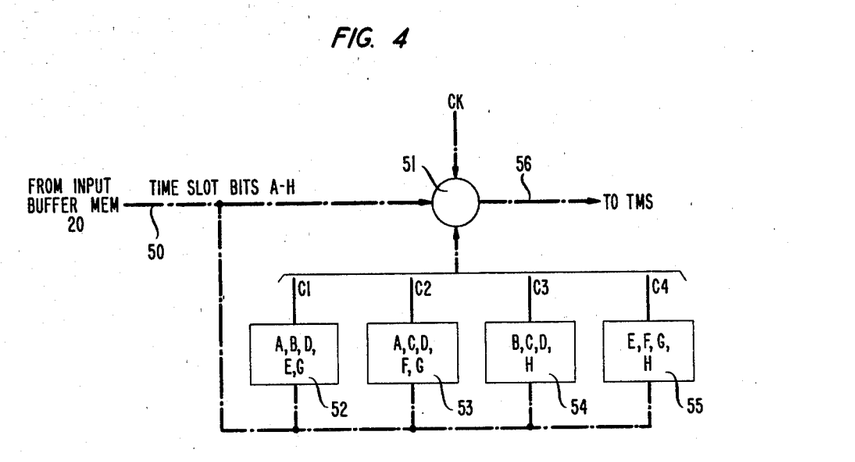
FIG. 4 shows further details of an illustrative circuit used in FIG. 1 to generate so-called Hamming error correction code digits over the information digits of a time slot.

FIG. 4 shows further details of the Hamming code generation circuit 23 in each of the input TSIs. Time slot information being read out of time slot storage, such as ITS1, of an input buffer memory in FIG. 1 is applied in parallel on leads 50 to circuit 23. Time slot information at this point consists of 8 bits which are arbitrarily identified as bits A through H in FIG. 4. These information bits are applied to a gating circuit 51 and to conventional parity generating circuits 52 through 55. In this illustrative embodiment, circuit 52 generates odd parity over information digits A, B, D, E, and G to generate check bit C1. Circuits 53, 54, and 55 each generate parity over the information digits shown in the respective blocks of FIG. 4 to generate check bits C2, C3, and C4. Each of these check bits are also applied to gating circuit 51. Gating circuit 51 is driven by the signals CK such that bit A is outputted on output lead 56 to the TMS during the first bit time of the time slot. Bits B through H are gated to output lead 56 during the second through the eighth bit times of the time slot. Check bits C1 through C4 are gated to output lead 56 by circuit 51 during the ninth through the twelfth bit times of a time slot.

Figure 5:
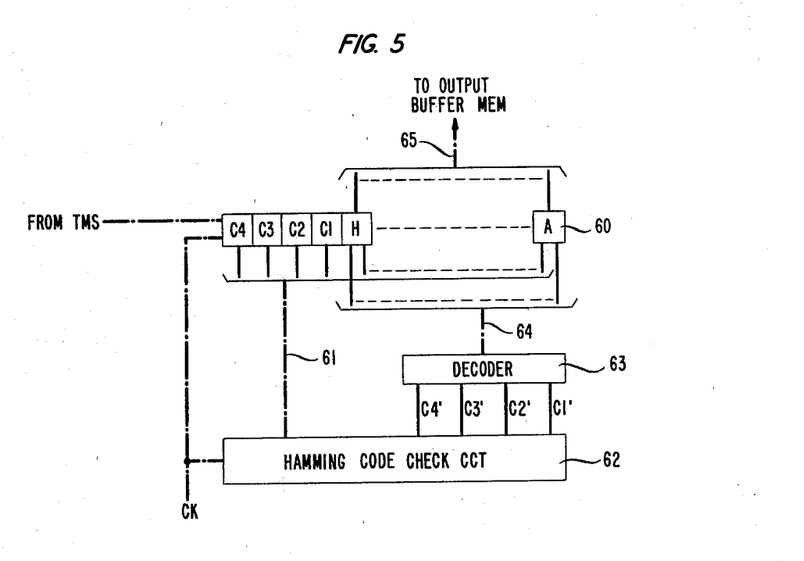
FIG. 5 shows further details of an illustrative circuit in FIG. 1 used to convert a serial bit stream that has been transmitted through the TMS into a parallel data word for storage in an output TSI of the network and further to check and correct errors that may have occurred in the bits of time slots during transmission through the TMS.

FIG. 5 shows further details of serial-to-parallel-converter 24 in each of the output time slot interchanges. Circuit 24 illustratively comprises a shift register 60 which has storage locations for each of the 8 information digits A through H of a time slot and for the corresponding check bits C1 through C4. The bits are shifted into their respective positions in register 60 as they arrive serially from the TMS. When all bits are present in the register as determined by the signals CK, the contents of register 60 are applied by means of leads 61 to Hamming code check circuit 62. Hamming code check circuit 62 contains conventional parity generating circuits which regenerate parity over the same subsets of information digits as the circuits 52 through 55 in FIG. 4, and also over the respective check bits. For example, part of circuit 62 generates odd parity over information bits A, B, D, E, G, and check bit C1. The result of this parity generation appears on lead C1' from circuit 62. The results of the parity generation of the other blocks of information and check bits appear on leads C2' through C4'. The signals on leads C1' through C4' identify in accordance with the Hamming Teaching which single bit, if any, stored in register 60 is in error. A state of 0000 on leads C1' through C4', in accordance with the Hamming Teaching, means that no errors are present. Decoder 63 translates these signals into a 1 out of 8 format corresponding to information bits A through H and applies a signal to an appropriate one of its output leads 64 which, in turn, changes the binary state of a bit in error in shift register 60. An error in one of the check bits C1 through C4 is also correctable in the Hamming technique. However, in this embodiment the check bits are not propagated further and are therefore not corrected by circuit 24. After correction the information bits are outputted on leads 65 and stored in an appropriate time slot location of the respective output buffer memory such as 25 in FIG. 1.

Figure 6:
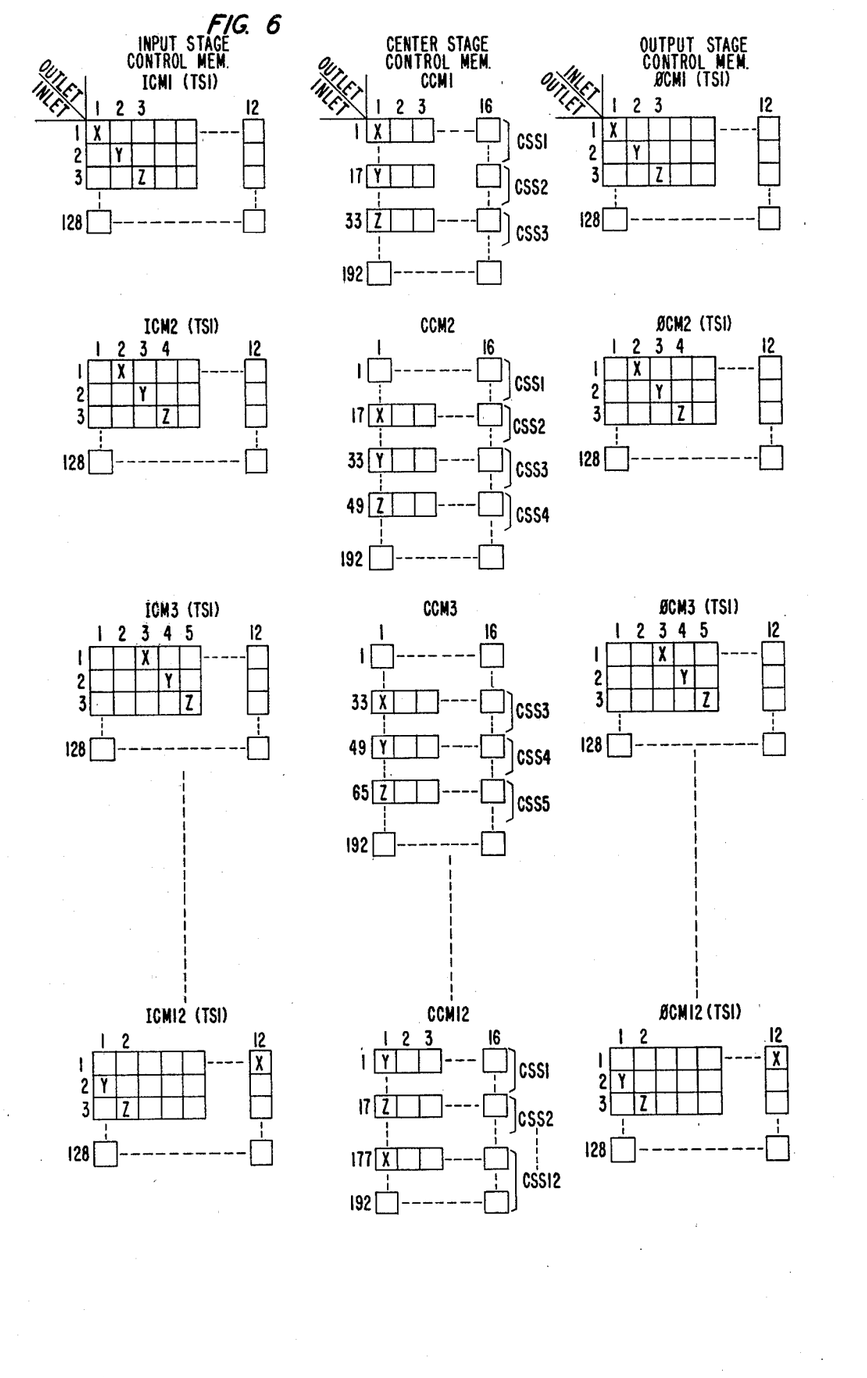
FIG. 6 shows an illustrative format of the TMS control memories of FIG. 1 and information stored in the memories for controlling the TMS in accordance with the invention in the process of handling 3 simultaneous exemplary calls.

FIG. 6 illustrates part of each of the illustrative control memories ICM, CCM, and ØCM for bit times 1, 2, 3 and 12. Word 1 of ICM1, ICM2, etc. corresponds to inlet 1 of ISS1, ISS2, etc. Word 2 corresponds to inlet 2, and so on. Each bit of a word identifies an outlet of the associated grid.

Since there are 128 input TSIs in this illustrative embodiment, with 8 TSIs assigned to each input stage grid, words 1 through 8 of each section of ICM, such as ICM1, are associated with inlets 1 through 8 of ISS1, words 9 through 16 are associated with inlets 1 through 8 of ISS2, and so on. With respect to ØCM, shown on the right side of FIG. 6, words 1 through 8 of each section, such as ØCM1, are associated with outlets 1 through 8 of ØSS1, words 9 through 16 of each section are associated with outlets 1 through 8 of ØSS2, and so on. Each bit of an ØCM word identifies an inlet of the associated grid. Each section of CCM, shown in the center of FIG. 6, is organized as follows. Words 1 through 16 are associated, respectively, with inlets 1 through 16 of CSS1; words 17 through 32 are associated, respectively with inlets 1 through 16 of CSS2, and so on.

Each bit of the above memories is associated with a switch of the grid which when operated will connect the identified inlet to the identified outlet of the grid. A logical "1" in a bit means that the corresponding switch is to be operated. Accordingly, a "1" in bit 1 of word 1 of ICM1, for example, means that a switch is to be operated connecting ISS1 inlet 1 to outlet 1.

FIG. 6 will be used to further describe the operation of the network under the assumption that three calls, X, Y, and Z, are in progress. In order to simplify FIG. 6, it is assumed that each of the calls is routed via TMS input stage grid ISS1 and output stage grid ØSS1. It is further assumed for simplicity that each call is assigned to network time slot 1.

On the left side of FIG. 6 are shown the first three words 1 to 3 of each of the input control memory sections ICM1, 2, 3 and 12. It is recalled that each of ICM1 through ICM12, is used to control the input grids ISS1 through ISS12 during bit times 1 through 12, respectfully. On the right of the FIG., the first three words of the memory sections ØCM1, 2, 3 and 12 are shown.

In the center of FIG. 6 are shown parts of the control memory sections CCM1, 2, 3 and 12. The contents of sections 4 through 11 of ICM, CCM and ØCM can be derived in a straight-forward fashion from the memory contents shown in FIG. 6.

When each of the calls X, Y, and Z are first originated and CPU 37 recognizes the origination and the intended destination, it performs a path hunt function for a time slot path through the network to partially complete the desired connection. Techniques of performing such path hunts for TDM networks are well known and will not be described further herein. In accordance with our invention, however, a path resulting from the hunt will be only one of a plurality of paths through the network that will be used to form the network connection on a given call, as will be shown.

Figure 7:
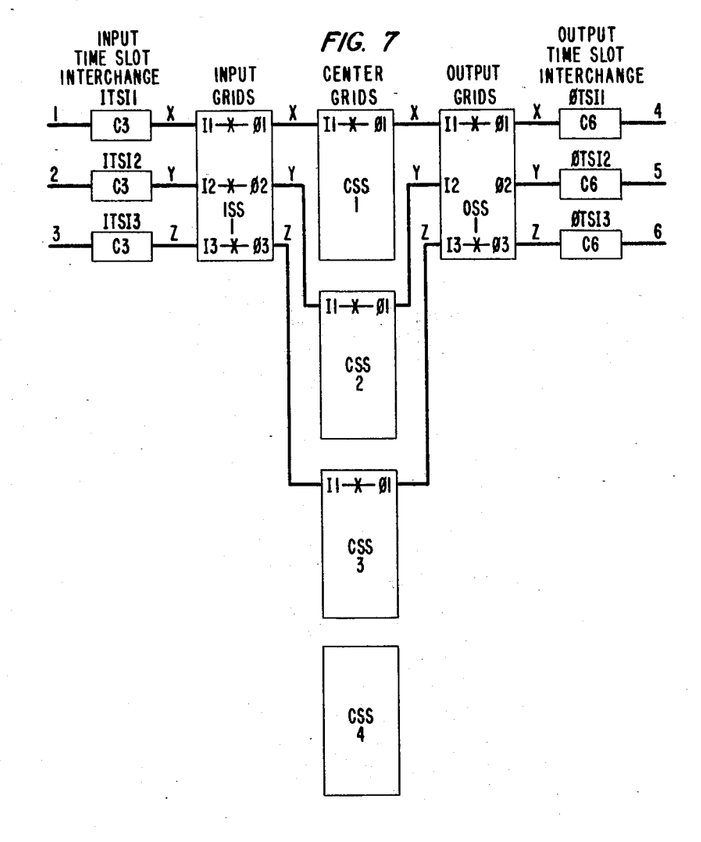
FIGS. 7 and 8 show illustrative configurations of the TMS during the first two bit times of a time slot in the processing of the exemplary calls.

With reference now to FIG. 7, it is assumed that calls X, Y, and Z arrive on channel 3 (C3) of respective incoming TDM trunks 1, 2, and 3. As seen, trunks 1, 2, and 3 are respectively served by input time slot interchanges ITSI1 through ITSI3. It is also assumed that the calls are to be routed to channel 6 (C6) of respective outgoing TDM trunks 4, 5, and 6. Trunks 4, 5 and 6 are respectively served by output time slot interchanges ØTSI1 through ØTSI3. Actually, for purposes of our invention, the incoming and outgoing channels are not significant, but they are included here for completeness.

It is further assumed that the path hunt results in the following path assignments as shown in FIG. 7. Each of the calls is switched in time slot 1. Call X is assigned to center stage grid CSS1. Accordingly, its assigned path is inlet 1 and outlet 1 of ISS1, inlet 1 and outlet 1 of CSS1, inlet 1 and outlet 1 of ØSS1. Call Y is assigned to center stage grid CSS2. Its assigned path is therefore inlet 2 and outlet 2 of ISS1, inlet 1 and outlet 1 of CSS2, and inlet 2 and outlet 2 of ØSS1. Call Z is assigned to CSS3. Its assigned path is therefore inlet 3 and outlet 3 of ISS1, inlet 1 and outlet 1 of CSS3, and inlet 3 and outlet 3 of ØSS1.

In the illustrative embodiment, the assigned path for a call is used to transmit the first bit of each network time slot for the call. The path for the second bit of each time slot is determined by shifting the center stage path to the grid immediately below the grid used to transmit the first bit. The third bit is transmitted via the next lower center stage grid, and so on. If the last center stage grid (CSS12) is used to transmit a bit other than the last (12th) bit of a network time slot, the first stage CSS1 is used to transmit the next bit. Thereafter, the remaining bits of the time slot are transmitted as described above.

The path hunt program, after determining the assigned path for a call, loads the network control memories with data to control the TMS switches each bit time to establish the connections described above. The memories in FIG. 6 are loaded to control the TMS for calls X, Y, and Z in accordance with the above assumptions. An X, Y, or Z in a bit of any of the control memories in FIG. 6 represents a logical "1" in that bit, and a logical "1" in such a bit means that the TMS switch associated with the bit is to be operated.

At bit time 1 of network time slot 1, all words 1 through 128 are read from ICM1 and stored in holding memory 34 in FIG. 2. Similarly, words 1 through 192 are read from CCM1 and stored in holding memory 35, and words 1 through 128 of ØCM1 are stored in holding memory 36. In accordance with the data in words 1 through 3 of ICM1, now in holding memory 34, switches in ISS1 are operated to connect inlet 1 to outlet 1 (call X), inlet 2 to outlet 2 (call Y), and inlet 3 to outlet 3 (call Z). In accordance with the data in words 1, 17, and 33 of CCM1, switches in CSS1 (call X), CSS2 (call Y), and CSS3 (call Z) are operated to connect the respective inlets 1 of the grids to their respective outlets 1. In accordance with the data in words 1 through 3 of ØCM1, ØSS2 switches are operated to connect inlets 1 (call X), 2 (call Y), and 3 (call Z) to respective outlets 1, 2, and 3.

These connections form the TMS linking pattern shown in FIG. 7 during bit time 1. Other connections may, of course, be established, but only calls X, Y, and Z are considered here.

Figure 8:
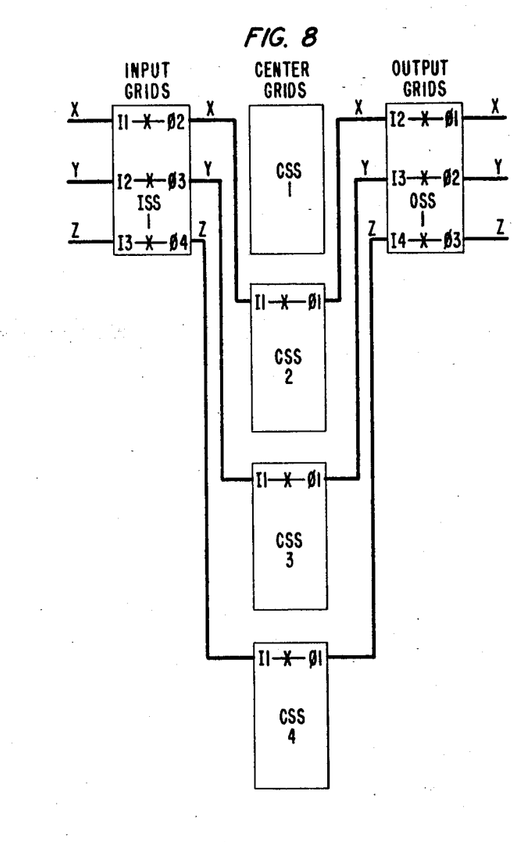

At bit time 2, the contents of ICM2, CCM2, and ØCM2 are read into holding memories 34, 35, and 36, respectively. From FIG. 6, it is seen that the X, Y, Z information in ICM2 is shifted so that call X is now switched from inlet 1 to outlet 2 of ISS1. From FIG. 1 it is seen that outlet 2 is connected to inlet 1 of CSS2. Bit 1 of word 17 of CCM2, controls the switching of CSS2 inlet 1 to CSS2 outlet 1. This outlet connects to inlet 2 of ØSS1. With reference to ØCM2, it is seen that ØSS1 inlet 2 is controlled to switch call X to its outlet 1. Thus, it is seen that bit 2 of this time slot pertaining to call X is switched in the TMS via the next successive lower center stage grid (CSS2) that was used to switch bit 1. Calls Y and Z are switched in a similar manner. Whereas bits 1 of calls Y and Z are switched via respective center stage grids CSS2 and CSS3, bits 2 of Y and Z are switched via respective grids CSS3 and CSS4. FIG. 8 shows the network configuration for these calls during bit time 2. This process of reconfiguring the TMS at each bit time of a time slot continues for each of the 12 bits of a network time slot. By examining ICM12, CCM12, and ØCM12 of FIG. 6, it is seen that bit 12 of time slot for call X is transmitted via CSS12, and that bit 12 for calls Y and Z are transmitted via CSS1 and CSS2, respectively. The described path reconfiguration for calls X, Y and Z repeats for each occurrence of network time slot 1.

Importantly, it is seen that the entire path through the TMS is different for each bit of a time slot of a call. For example, different switches of ISS1 and ØSS1 are used for each bit of a time slot of call X in order to transmit each bit via a different center stage grid. Therefore, a single failure at any point in that portion of the TMS used to switch call X, for example, can result in only 1 bit error in each time slot. Such a single bit error is corrected by circuits 24 by using the Hamming check bits added to each time slot by circuits 23.

Although in the preferred embodiment the blocks of time slot information that are transmitted via different TMS paths are each 1 bit long, it is obvious in view of this teaching that any desired block length may be used. For example, a block might correspond to a time slot, in which case the information content of each of a set of time slots of a call would be switched via different paths if desired. A single fault in the network would cause the loss of a full time slot of information in such an embodiment. Although it is technically possible to add sufficient data redundancy across a plurality of time slots to be able to correct this loss of information, it appears economically infeasible to do so. The arrangement, however, can be perfectly satisfactory for transmitting a digitized analog conversion if a sufficient number of different TMS paths are used to switch the call.

It is also obvious in view of this teaching that block lengths other than 1 bit or 1 time slot in length are possible. Such arrangements would, in general, require additional buffering so that the blocks could be formed independently of the arrival of the time slot information.

In view of the teaching, arrangements for controlling a TMS in accordance with the invention are suggested for controlling a TMS other than by prestoring information for every TMS switch for every bit or block time. For example, the number of the center stage grid to be used to transmit a block can be incremented and stored after each block time. At the beginning of the next block time, the center stage grid number can be read and the states of the remaining TMS switches needed to establish the full TMS connection between the TSIs in question derived and executed in accordance with the configuration of the network.

The invention taught herein is directly extendible to time division networks having other than time-space-time configurations as shown in the preferred embodiment. Both space portions of a space-time-space configured network, for example, can be controlled in a manner similar to that described herein. Error correction information can be added to the data blocks ahead of the input space portion of the network and extracted after transmittal through the output space portion. Alternatively, error checking information can be added and extracted at the input and output of each of the space portions of the network.

It is to be understood that the within described arrangement is illustrative of the principles of the invention and that numerous other embodiments of the invention within the spirit and scope of the invention may be achieved by those skilled in the art.

We claim:

1. In a time division multiplex switching system comprising a switching network (FIGS. 1 to 3), at least part of which includes a space switching portion (TMS) for interconnecting input and output channels in which each channel is manifested by recurring periodic time slots each containing a prescribed number of information digits, a method of establishing connections through the network characterized by the steps of
   A. establishing a first time slot path through the network for communications between an input channel and an output channel,
   B. transmitting a block of information of predetermined size from the input channel to the output channel via the established time slot path,
   C. reconfiguring the space portion of the network after transmission of the block of information to establish a different time slot path between the input and output channels,
   D. repeating steps B and C for a predescribed number of successive blocks of information from the input channel, and
   E. repeating steps A through D.

2. The invention of claim 1 in which each said block corresponds to a time slot of the input channel.

3. The invention of claim 1 in which said each block corresponds to each digit of the input channel.

4. The invention of claim 3 in which the prescribed number of successive blocks corresponds to the number of digits in a time slot.

5. In a time division multiplex switching system comprising a switching network (FIGS. 1 to 3), at least part of which includes a space switching portion (TMS) for interconnecting input and output channels in which each channel is manifested by recurring periodic time slots each containing a prescribed number of information digits, a method of establishing connections through the network in which in response to a call a first path through the network is selected between an input channel and an output channel in accordance with a path hunt algorithm, said method being characterized by the steps of
   transmitting one of the information digits of one of the time slots of the input channel to the output channel via the first path, and
   reconfiguring the space portion of the network after the transmission of said one and each other information digit of said time slot such that each said digit is transmitted to the output channel via a different path of the space portion.

6. The invention of claim 5 further comprising the step of
   generating error checking digits responsive to the information digits in the time slot of the input channel, and in which
   the reconfiguring step includes the transmission of each of the error checking digits and the information digits for the time slot through different paths of the space portion of the network.

7. The invention of claim 6 further comprising the step of
   processing the error checking and information digits associated with the time slot for errors after their transmission through the space portion of the network.

8. The invention of claim 7 in which the error checking digits provide error correcting capability of a prescribed number of the information digits of the time slot and said processing step further comprises the step of correcting errors in the information digits after transmission through the space portion of the network.

9. The invention of claim 5 in which the network comprises
   a plurality of input time slot interchanges (ITSI1 to ITSI128),
   a plurality of output time slot interchanges (ØTSI1 to ØTSI128),
   a plurality of space switching grids (CSS1–CSS12) equal in number to at least the number of digits in a time slot,
   first means (ISS1–ISS16, 10, 11) for connecting each of the input time slot interchanges to each of the grids,
   second means (12, 13, ØSS1–ØSS16) for connecting each of the grids to each of the output time slot interchanges, and in which the reconfiguring step comprises the step of
   controlling the first and second connecting means to route each digit of the time slot via a different grid.

10. The invention of claim 5 further comprising the steps of generating a plurality of error checking digits for the time slot in accordance with the information digits of the time slot, transmitting the information and error checking digits for the time slot through different paths of the space portion of the network, and using the error checking digits to check the information digits for errors in transmission through the network.

11. Means for controlling the establishment of connections in a time division multiplex switching network comprising at least a space switching matrix (TMS), said network being operative to interconnect an input and an output channel in which each channel is manifested by recurring periodic time slots each containing a prescribed number of information digits, said controlling means being characterized by means (32, 33) for partitioning the information digits of the incoming channel into successive blocks each having a predetermined number of digits, and means (ICM, CCM, ∅CM, 34, 35, 36) responsive to the partitioning means for reconfiguring the space switching matrix in a prescribed manner before the transmission through the network of each of a predetermined number of blocks of the input channel such that each block of the predetermined number of blocks is transmitted via a different path of the space switching matrix.

12. The invention of claim 11 in which each said block corresponds to a time slot of the input channel.

13. The invention of claim 11 in which each said block corresponds to each digit of the input channel.

14. The invention of claim 13 in which the predetermined number of blocks corresponds to the number of digits in a time slot.

15. The invention of claim 11 further characterized by means (23) for computing error detecting digits over the information digits contained in the predetermined number of blocks before transmission through the space switching matrix, wherein the partitioning means operate to partition the error detecting digits and the information digits into a set of said blocks, and the reconfiguring means operate to cause the transmission of each of the blocks of the set via a different path of the space switching matrix.

16. The invention of claim 15 characterized by means (24) responsive to the information and error detecting digits in the set of blocks after transmission through the space switching matrix for detecting errors in the information digits.

17. The invention of claim 16 wherein the detecting means comprises means (62, 63) for correcting said errors in the information digits.

18. Means for controlling the establishment of connections in a time division multiplex switching network comprising an input time slot interchange (ITSI1), an output time slot interchange (∅TSI1), and a space switching matrix (TMS) interconnecting the input and output interchanges, said network being operative to interconnect an input and an output channel in which each channel is manifested by recurring periodic time slots each containing a prescribed number of information digits, said controlling means being characterized by means (30, 32, 33) for generating timing signals defining each time slot and the digit times within each time slot, and means (ICM, CCM, ∅CM, 34, 35, 36) responsive to the timing signals for reconfiguring the space switching matrix every digit time in a prescribed manner such that each digit of a time slot in the input channel is transmitted from the input time slot interchange to the output time slot interchange via a different path of the space switching matrix.

19. The invention of claim 18 in which the space switching matrix comprises a plurality of first switching grids (CSS1–CSS12) each having a plurality of switches, said switching grids being equal in number to at least the number of digits in a time slot, first means (ISS1, 10) for connecting the input time slot interchange to each of the first grids, and second means (12, ∅SS1) for connecting each of the first grids to the output time slot interchange, and in which the reconfiguring means comprises third means (ICM, ∅CM) for operating the first and second means to select a different first grid each digit time of a time slot to complete a path between the input and output time slot interchanges, and fourth means (CCM) for operating an appropriate switch in the selected first grid each digit time to complete the path.

20. The invention of claim 19 wherein the first connecting means comprises a second switching grid (ISS1) having a plurality of switches for connecting the input time slot interchanges to each of the first grids, the second connecting means comprises a third switching grid (∅SS1) having a plurality of switches for connecting each of the first grids to the output time slot interchange.

21. The invention of claim 20 wherein the third operating means comprises a first data memory (ICM) having separate storage locations for each said switch of the second grid and a second data memory (∅SM) having separate storage locations for each said switch of the third grid, each of the storage locations being for controlling the state of the switches in accordance with the logic state of the associated memory locations.

22. The invention of claim 21 wherein the fourth operating means comprises a third data memory (CCM) having separate storage locations for each said switch of the first grids for controlling the state of these switches in accordance with the logic state of the associated storage locations.

23. The invention of claim 22 in which the storage locations of each of the first through third data memories is divided into sections (ICM1, 2 . . . ; CCM1, 2 . . . ; ∅CM1, 2 . . . ) equal in number to the number of digits in a time slot, each section being associated with a different digit time in a time slot, each section being further divided into subsections (TS1, TS2, . . . ) individually associated with different ones of the network time slots, wherein each subsection contains a separate storage bit for each switch in the grid associated with the subsection, wherein each data memory is responsive to the timing signals defining each time slot and the digit times within a time slot to output the bits contained in the appropriate subsections for control of the first, second and third grids.

24. The invention of claim 22 in which each of the first through third data memories is divided into a plurality of subsections (TS1, TS2, . . . ) equal in number to the number of network time slots multiplied by the number of digits in each time slot, and wherein each subsection is uniquely associated with one of the recurring time slots and with a prescribed digit time within the time slot and contains information specifying the state of each switch of its associated grid during the prescribed digit time of said one of the time slots.

* * * * *